United States Patent [19]

Kasugai et al.

[11] Patent Number: 4,724,868
[45] Date of Patent: Feb. 16, 1988

[54] CAP WITH VALVE

[75] Inventors: Joji Kasugai, Ichinomiya; Satoshi Toki, Inazawa, both of Japan

[73] Assignee: Toyoda Gosei Co., Ltd., Nishikasugai, Japan

[21] Appl. No.: 4,099

[22] Filed: Jan. 16, 1987

[30] Foreign Application Priority Data

Jan. 17, 1986 [JP] Japan .................................. 61-8736

[51] Int. Cl.⁴ .......................................... F16K 17/02
[52] U.S. Cl. .............................. 137/516.29; 220/209; 251/284
[58] Field of Search .................. 220/209; 251/284; 137/516.29

[56] References Cited

U.S. PATENT DOCUMENTS

| | | |
|---|---|---|
| 4,051,975 | 10/1977 | Ohgida et al. . |
| 4,102,472 | 7/1978 | Sloan, Jr. . |
| 4,129,144 | 12/1978 | Andersson ................. 137/516.29 X |
| 4,294,376 | 10/1981 | Keller . |
| 4,337,873 | 7/1982 | Johnson ......................... 220/209 X |
| 4,494,673 | 1/1985 | Hiraishi . |
| 4,501,407 | 2/1985 | Murray ......................... 251/284 X |
| 4,540,103 | 9/1985 | Kasugai et al. . |
| 4,572,396 | 2/1986 | Kasugai et al. . |
| 4,588,102 | 5/1986 | Kasugai . |

Primary Examiner—Robert G. Nilson
Attorney, Agent, or Firm—Cushman, Darby & Cushman

[57] ABSTRACT

A cap with valve has a fluid flowing hole formed within a cylindrical cap body installed in an aperture of a container. A valve body is installed within the cap body and has a seal lip opened in an umbrella-like shape which is inserted in the fluid flowing hole and pressed against the periphery of the fluid flowing hole at the rear side in the inserting direction so as to close the fluid flowing hole. The valve body is held by a support plate having rigidity installed within the cap body, and is urged by a biasing means installed within the cap body for urging the support plate so that the valve body is inserted in the fluid flowing hole. A stopper is formed on the support plate and abuts on the cap body and restricts moving of the valve body so that the valve body together with the support plate is prevented from being subjected to pressure beyond a prescribed value to move it further in the inserting direction towards the fluid flowing hole.

2 Claims, 4 Drawing Figures

CAP WITH VALVE

BACKGROUND OF THE INVENTION

The present invention relates to a cap with valve, such as a fuel cap for automobiles, which is installed to an aperture of a container such as a filler neck of a fuel tank and can adjust pressure in the container such as fuel tank.

Such cap is disclosed, for example, in a fuel cap for automobiles shown in FIG. 1 (refer to U.S. Pat. No. 4,337,873).

The fuel cap 1 comprises a cap body 2 threadedly engaged with a filler neck of a fuel tank, and a flowing hole 3a of round shape formed on a ceiling plate 3 of the cap body 2 so that the air can flow into the fuel tank. A valve body 8 is urged by a coil spring 6 and inserted in the flowing hole 3a from lower side so that the valve body 8 acts while pressure within the fuel tank is negative and the flowing hole 3a is closed always except the acting state.

The valve body 8 is provided at lower side with a base portion 8b to be fitted to the top end of the coil spring 6 and with a seal lip 8a in umbrella-like shape. The seal lip 8a is pressed against periphery at the bottom end of the flowing hole 3a at rear side in the inserting direction so as to close the flowing hole 3a. The valve body 8 moves downward against the biasing force of the coil spring 6 while pressure within the fuel tank is negative thereby the seal lip 8a is separated from periphery at the bottom end of the flowing hole 3a and the air flows from the flowing hole 3a into the fuel tank. Numeral 8c designates a rod portion projecting at the center of the top end of the valve body 8. The rod portion 8c is inserted in a guide hole 5a of a guide member 5 projecting on the ceiling plate 3 thereby eccentricity of the valve body 8 is prevented. Numeral 4 designates a locking lug projecting from the ceiling plate 3, and numeral 7 designates a spring shoe.

In the fuel cap 1 of the prior art, however, except the acting state of the valve 8, the seal lip 8a opened in umbrella-like shape is inserted in the flowing hole 3a and pressed against periphery at the bottom end of the flowing hole 3a so as to close the flowing hole 3a. That is, when the temperature rise is accompanied with evaporation of the fuel and the pressure within the fuel tank becomes positive pressure beyond prescribed valve, the valve body 8 is slightly moved in the inserting direction being the closing direction and is further inserted in the flowing hole 3a so that the seal lip 8a is closed.

Consequently, if the positive pressure state continues for a long period, the seal lip 8a in itself will be be closed and subjected to the premanent deformation in the closed state thereby the seal property and the negative pressure eliminating capacity of the valve body 8 may be deteriorated.

SUMMARY OF THE INVENTION

An object of the invention is to provide a cap with valve, wherein a valve body has a seal lip opened in umbrella-like shape, moving of the valve body is limited even if the valve body is subjected to pressure in the flowing hole inserting direction being the closing direction for a long period, the seal lip is prevented from being closed beyond prescribed valve to affect the seal property and the pressure adjusting capacity of the valve body, and the performance of the valve body can be maintained for a long period.

Above object can be attained by a cap with valve, wherein a valve body is installed in a cap body and inserts a seal lip opened in umbrella-like shape through a biasing means to periphery at end portion of a fluid flowing hole formed in the cap body so as to close the fluid flowing hole except acting state of the valve body, the cap body is installed at an aperture of a container and pressure within the container can be adjusted by action of the valve body, the valve body is assembled with a support plate having rigidity connected to a biasing means, and when the valve body is subjected to pressure beyond prescribed valve and moved in the fluid flowing hole inserting direction, a stopper formed on the support plate abuts on the cap body and limits the moving of the valve body in the inserting direction.

DESCRIPTION OF THE PREFERRED EMBODIMENT

Figure 1:
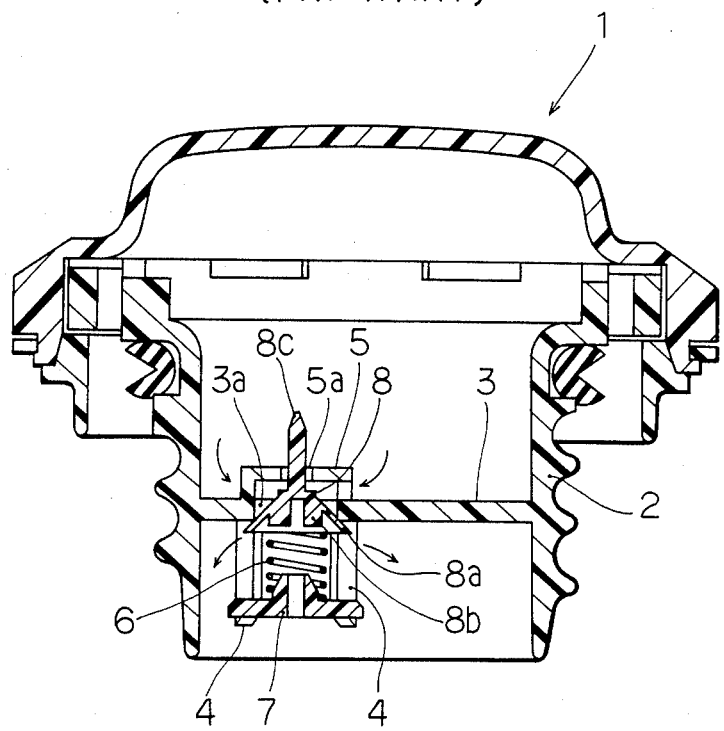
FIG. 1 is a sectional view of a fuel cap in the prior art.
Figure 2:
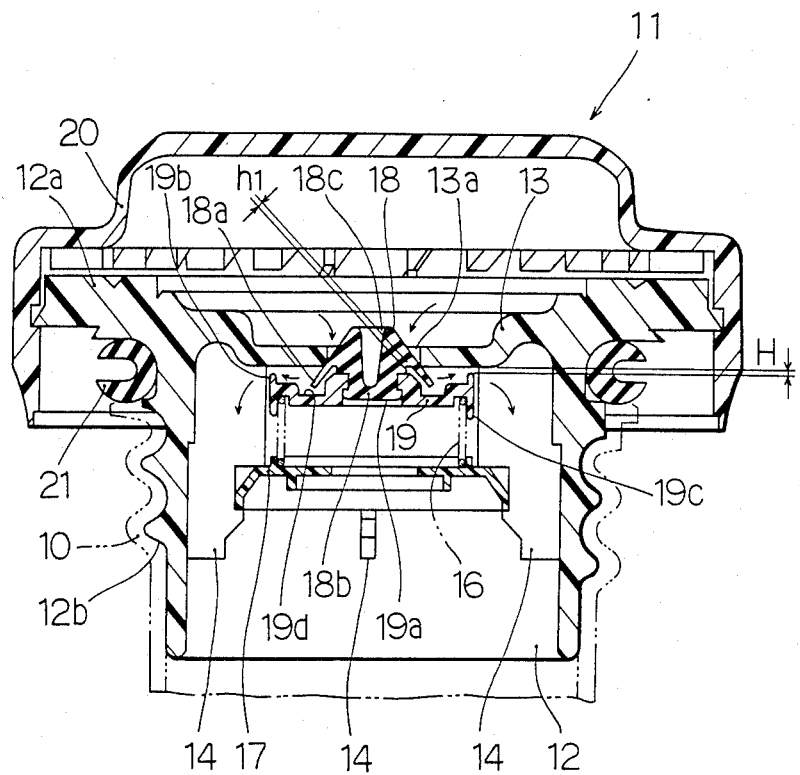
FIG. 2 is a sectional view of a fuel cap as an embodiment of the invention.
Figure 3:
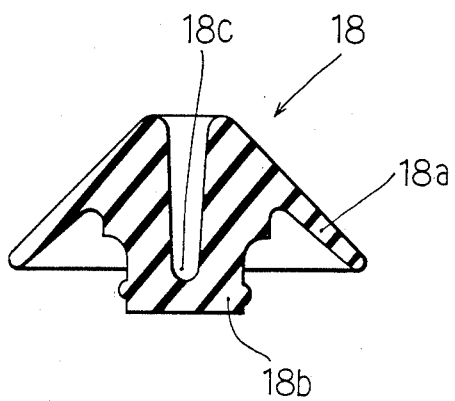
FIG. 3 is an enlarged sectional view of a valve body in the embodiment.
Figure 4:
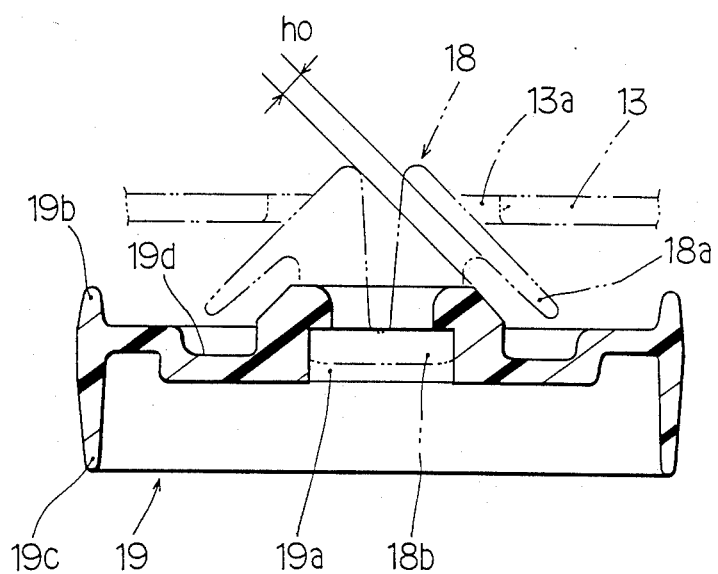
FIG. 4 is an enlarged sectional view of a support plate in the embodiment.

A cap with valve in an embodiment is a fuel cap 11 comprising a cap body 12 threadedly engaged with a filler neck 10 of a fuel tank for an automobile.

The cap body 12 is of nearly cylindrical form, and provided on upper side of outer circumference with a flange 12a to which an upper cover 20 is fitted and on lower side of outer circumference with a thread 12b corresponding to the filler neck 10. The cap body 12 is also provided on upper side of inner circumference with a ceiling plate 13 having a flowing hole 13a of round shape at the center. A support projection 14 for locking a spring shoe 17 extends downward from the bottom surface of the ceiling plate 13. Numeral 21 designates a seal ring.

A valve body 18 made of high-molecular elastic material such as rubber or thermo-plastic elastomer is arranged at the flowing hole 13a of the ceiling plate 13, and a seal lip 18a of the valve body 18 is opened in umbrella-like shape and the outside form thereof is that of a circular truncated cone. The valve body 18 is inserted in the flowing hole 13a from lower side, and a part of the outer circumferential surface of the seal lip 18a is pressed against the periphery at the bottom end of the flowing hole 13a so as to close the flowing hole 13a. In this embodiment, a curved surface with a curvature radius of about 0.5 mm is formed at the bottom end of the flowing hole 13a against which the seal lip 18a is pressed.

A cylindrical base portion 18a is formed by enlarging the lower side of the valve body 18, and the base portion 18b is assembled with a support plate 19 made of plastic material having rigidity such as polyacetal.

The support plate 19 is of circular ring form, an end level difference is formed on an inner circumferential portion 19a of the support plate 19 and the base portion 18b of the valve body 18 is fitted to the inner circumferential portion 19a so as to support the valve body 18. Numeral 18c designates a recess formed at the center of the valve body 18 so that the base portion 18b is not deformed during the assembling with the support plate 19.

An annular stopper 19b in continuous or non-continuous state is formed on the outer periphery of the top surface of the support plate 19 and projects by a desired length so that the stopper 19b can abut on the bottom surface of the ceiling plate 13 at the periphery of the flowing hole 13a during upward movement of the support plate 19. An annular recess 19d is formed on the top surface of the support plate 19, if necessary, so that interference to the seal lip 18a of the valve body 18 does not occur during the deformation of the seal lip 18a.

An annular projection 19c is formed on the outer periphery of the bottom surface of the support plate 19 and projects downward. The top end of a coil spring 16 abuts on the bottom surface of the support plate 19 at the inner circumference of the projection 19c, and the bottom end of the coil spring 16 abuts on the spring shoe 17 held by the support projection 14 so that the valve body 18 is urged upward at the side of the flowing hole 13a.

The outer periphery of the support plate 19 is formed to have a portion disposed near the support projection 14, and the outer periphery is guided by the support projection 14 so as to prevent eccentricity of the valve body 18.

In the valve body 18 of the embodiment, the distance h0 between the rear surface of the seal lip 18a and the support plate 19 is made 1.0 mm when the valve body 18 is assembled with the support plate 19. The distance h1 between the rear surface of the seal lip 18a and the support plate 19 is made 0.7 mm when the valve body 18 is assembled with the cap body 12. Further in the support plate 19 of the embodiment, the distance H between the top end of the stopper 19b and the ceiling plate 13 is made 0.5 mm at assembled state with the cap body 12.

Operating mode of the fuel cap 11 in the embodiment will be described.

After the fuel cap 11 is installed to the filler neck 10, first at ordinary positive pressure state within the fuel tank, the valve body 18 is subjective to the biasing force of the coil spring 16 through the support plate 19 and the seal lip 18a is pressed against periphery of the bottom end of the following hole 13a so as to close the flowing hole 13a.

At negative pressure state within the fuel tank, the valve body 18 together with the support plate 19 is lowered against the biasing force of the coil spring 16, and the seal lip 18a is separated from periphery of the bottom end of the flowing hole 13a, thereby the flowing hole 13a is opened so that the air flows into the fuel tank and the negative pressure within the fuel tank is eliminated.

When the pressure within the fuel tank becomes positive pressure higher than prescribed valve, the valve body 18 is slightly moved upward being the closing direction. However, the support plate 19 to hold the valve body 18 is also moved upward so that the stopper 19b abuts on the bottom surface of the ceiling plate 13. Thereby the valve body 18 is prevented from moving further in the closing direction and being inserted in the flowing hole 13a and the seal lip 18a is prevented from being closed beyond prescribed value.

Accordingly, in the fuel cap 11 of the embodiment, even if the valve body 18 is subjected to the pressure in the inserting direction of the flowing hole 13a being the closing direction beyond the prescribed value and the state continues for a long period, the seal lip 18a is prevented from being closed beyond the prescribed value to deteriorate the seal property and the pressure eliminating capacity of the valve body 18, thereby the performance of the valve body can be maintained without deterioration for a long period.

In the fuel cap 11 of the embodiment, the stopper 19b of the support plate 19 abuts on the bottom surface of the ceiling plate 13 of the cap body 12. However, the stopper 19b may, of course, abut on the support projection 14 of the cap body 12 or inner circumferential portion of the cap body 12.

What is claimed is:

1. A valved cap, comprising:
   (a) a cylindrical cap body installed in closing relation to an aperture of a container and having a fluid flowing hole at inside therethrough, said fluid flowing hole having a periphery;
   (b) a valve body installed within said cap body and having a seal lip opened in an umbrella-like shape, which seal lip is inserted in said fluid flowing hole from a rear side in an inserting direction and pressed against the periphery of the fluid flowing hole at said rear side in relation to said inserting direction so as to openably close the fluid flowing hole;
   (c) a rigid support plate installed within said cap body for holding said valve body;
   (d) a biasing means installed within said cap body for urging said support plate so as to insert said seal lip of the valve body into the fluid flowing hole; and
   (e) a stopper formed on said support plate for restricting moving of the valve body by abutting on the cap body when the valve body together with the support plate is subjected to pressure beyond prescribed value and moved in the inserting direction to the fluid flowing hole.

2. A valved cap as set forth in claim 1, wherein:
   the fluid flowing hole of the cap body is formed in a ceiling plate formed on the inner circumference of a cylindrical portion of the cap body, and the stopper of the support plate abuts on the ceiling plate so as to restrict moving of the valve body and the support plate.

* * * * *